March 9, 1954  A. CALBIANI  2,671,679
CLAMP
Filed July 6, 1949  2 Sheets-Sheet 1
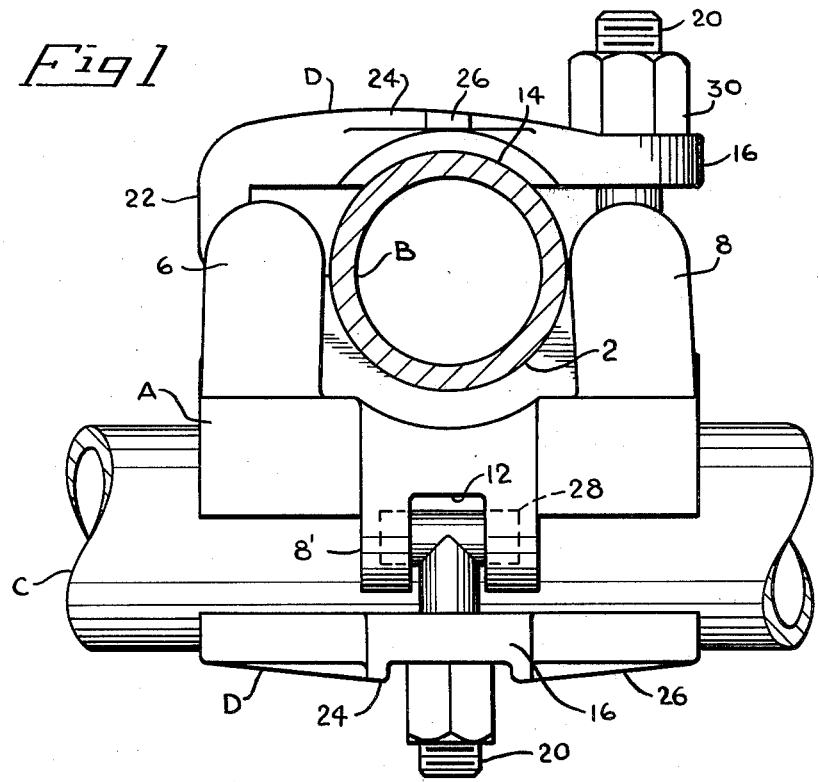
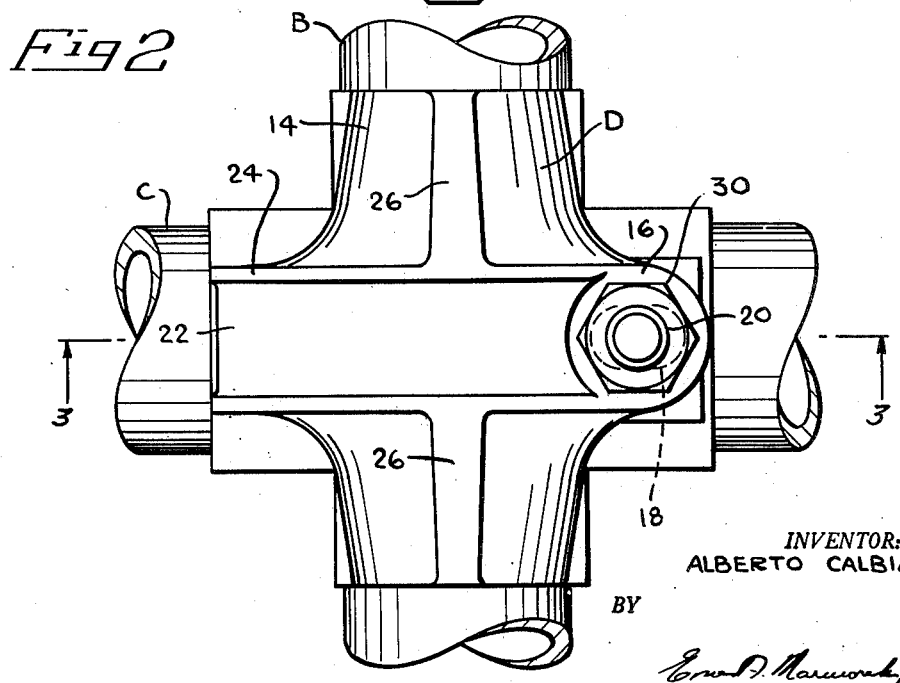
INVENTOR:
ALBERTO CALBIANI,
BY March 9, 1954          A. CALBIANI          2,671,679
CLAMP Filed July 6, 1949          2 Sheets-Sheet 2

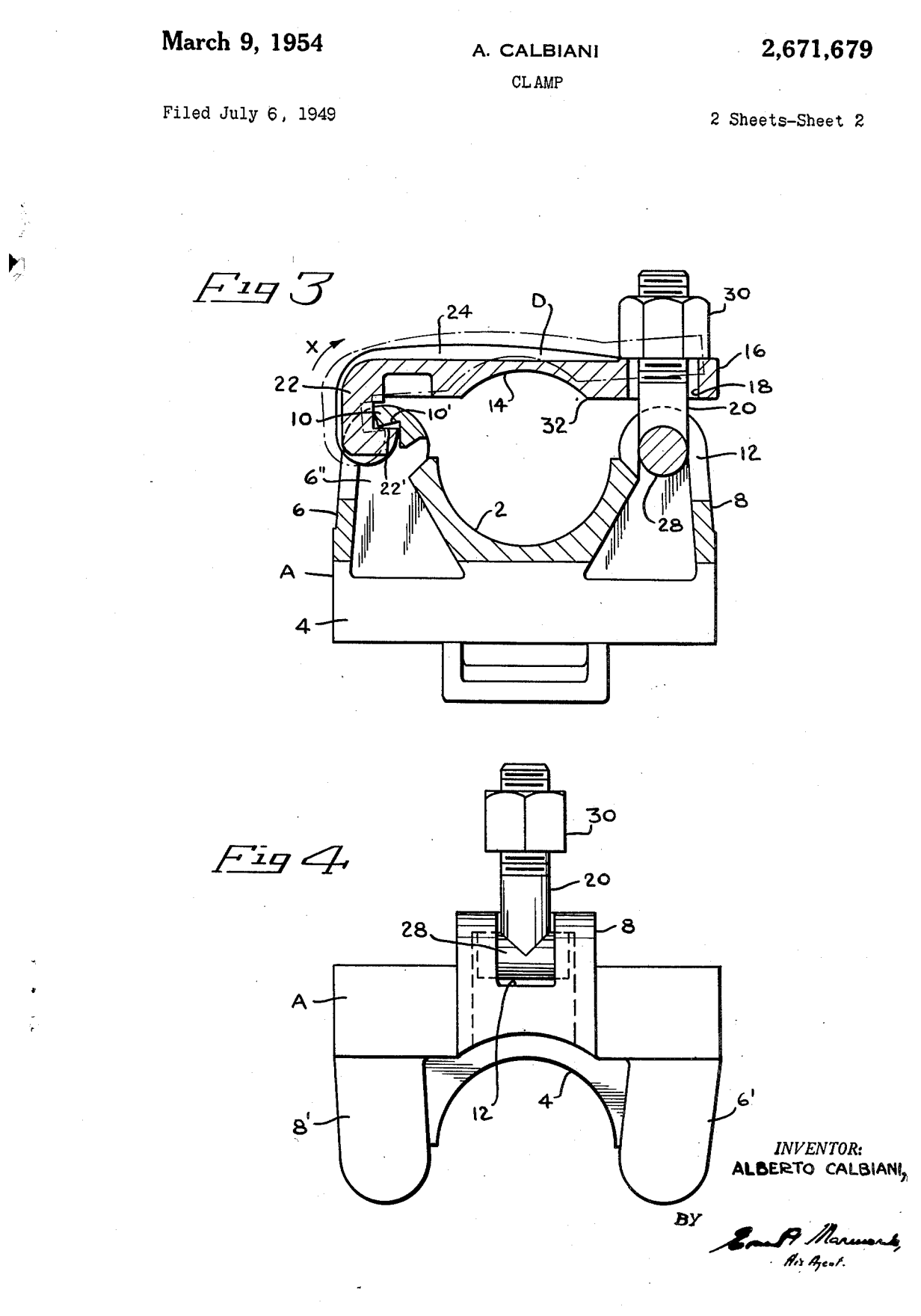

INVENTOR:
ALBERTO CALBIANI

Patented Mar. 9, 1954

2,671,679

UNITED STATES PATENT OFFICE 2,671,679

CLAMP

Alberto Calbiani, Milan, Italy, assignor to Ponteggi Tubolari Dalmine Innocenti S. p. A., Milan, Italy Application July 6, 1949, Serial No. 103,182

Claims priority, application Italy July 27, 1948

1 Claim. (Cl. 287—54)

The invention relates to clamps, and relates more particularly to releasable clamping apparatus for crosswise arranged pipes or other tubular elements, particularly for scaffoldings, trellis work, and the like.

The invention has among its objects to provide a clamp for interconnecting crosswise arranged pipes, which is simple in its operation and may quickly be tightened and released by turning of a few revolutions a nut that is threaded on a bolt.

The foregoing and other objects of the invention will be best understood from the following description of an exemplification thereof, reference being had to the accompanying drawing, wherein:

Fig. 1 is an elevational view of a clamp for two crosswise arranged fragmentarily illustrated pipes, in accordance with the invention;

Fig. 2 is a plan view thereof;

Fig. 3 is a sectional view taken on the line 3—3 of Fig. 2, but with the lower corner and bolt omitted; and Fig. 4 is a side elevational view of the center element shown in the preceding views, without covers though showing one of the bolts.

In carrying the invention into effect in one of the embodiments which has been selected for illustration in the accompanying drawing and for description in this specification, and referring now particularly to Figs. 1 and 4, there is provided a center element generally indicated A that has two concave oppositely directed grooves 2 and 4. Each of the grooves 2 and 4 is substantially semi-cylindrical to match a portion of a pipe. Thus, the groove 2 receives a pipe B, and the groove 4 a pipe C. The pipes B and C are crosswise arranged, with their axes at right angle, and the grooves 2 and 4 likewise are arranged crosswise at right angle and have their concavity in opposite directions.

The center element A has on one side, for instance the upper side as shown in Fig. 1, two upper hollow projections 6 and 8, and on the opposite side two corresponding lower hollow projections 6' and 8'. It will be understood that the terms "upper" and "lower" and "above" and "below," are used herein only in an illustrative, and not in any limiting, sense.

Each of the projections 6 and 6' has a sidewardly directed open passage 6", and the direction of that passage is at right angle to the axis of the pipe adjacent said projections. Thus, the direction of the passage 6" of the projection 6 is at a right angle to the axis of the pipe B while the direction of the passage of the projection 6' is at right angle to the axis of the pipe C. Each passage 6" is bordered by a wall portion 10 of the projection, and said wall portion 10 forms a latching surface 10' on the interior of the passage 6".

Each of the projections 8 and 8' is provided with a slot 12 (Figs. 3 and 4), that is formed about centrally of the center piece A. The direction of extension of the slot 12 is also at right angle to the axis of the adjacent pipe. Each of the projections 8 and 8' has a clamping element, such as a T-shaped bolt 20 that protrudes with its stem through the slot 12, and which has a round crossbar 28 that bears against the rounded inner surface formed by the wall of the extension on the interior adjacent to the slot 12. Thereby, the bolt 20 may tilt about the crossbar 28, in the slot 12, in opposite directions in a plane perpendicular to the axis of the pipe in the adjacent groove, and parallel to the direction of extension of the passage 6". Thus, the bolt 20 of the upper projection 8 may be tilted perpendicularly to the axis of the pipe B, while the bolt 20 of the lower projection 8' may be tilted perpendicularly to the axis of the pipe C. The tilting of the bolt 20 of the upper projection 8 thus takes place in the plane, at right angle to the axis of the pipe B, in which there extends the passage 6" of the upper projection 6; and conversely, the bolt 20 of the lower projection 8' tilts in a plane, at right angle to the axis of the pipe C, in which there extends the passage 6" of the lower projection 6'.

Two substantially identically dimensioned covers D are provided, one above and one below the center element A. Each of the covers D comprises a bridge section 24 that bridges a pipe; thus, the upper cover D is placed with its bridge section 24 over the pipe B, and the lower cover D below the pipe C. The bridge section 24 of each cover has formed about centrally on its interior a concave bearing surface 14 that, as best shown in Figs. 1 and 3, matches and extends along substantially one-fourth of the periphery of the pipe to which it is applied. Each pipe is thus being clamped between a groove of the center element A and a concave bearing surface 14 of a cover D.

Each cover D furthermore has on one side an extension 16 that is integral with the bridge section 24, and a hook section 22 which also is integral with the bridge section 24. Furthermore, each bridge section 24 is provided with crosswise arranged reinforcing ribs 26.

The hook section 22 of each cover D has near its innermost end a latching surface 22' that is designed to cooperate during clamping with the latching surface 10' on the interior of the passages 6".

The extension 16 of each cover D is provided with an oblong aperture or slot 18 (Figs. 2 and 3), that has a width which is only slightly larger than the diameter of the stem of the bolt 20 for passing the stem, but has a length that is appreciably larger than said diameter. The direction of elongation of said slot 18 of each cover D is perpendicular to the axis of the pipe to which the cover is applied, and is disposed in the plane of tilting of the bolt 20 thereof. The stem of each bolt 20 protrudes through the slot 18 of a cover D, so that its threaded end that carries a nut 30 projects beyond the cover D. Thus, the stem of the bolt 20 of the upper projection 8 protrudes through the slot 18 of the upper cover D, and the stem of the bolt 20 of the lower projection 8' extends through the slot 18 of the lower cover D.

The nut 30 is engaged on the threaded end of each bolt 20 and for clamping engages in abutment the outer surface of the extension 16.

The operation of the clamp is as follows.

Assuming that two pipes B and C are held in the clamps, release of the clamps is accomplished in the following manner.

For the purpose of exemplification we may first consider release of the upper pipe B.

The nut 30 of the upper bolt 20 is unscrewed for a few turns. Thereby it is disengaged from its abutment with the outer surface of the extension 16 of the cover D. Thereupon, the bolt 20 may be rocked for tilting in the direction towards the pipe B that is clamped between the concave bearing surface 14 of the upper cover D and the groove 2. The rocking movement of the cover D, about the axis of the cross-bar 28, includes a sideward component that is parallel to the direction of extension of the passage 6". Therefore, by this rocking movement, the hook section 22 of the cover D is moved out of the passage 6", the initial stage of disengagement of which is shown in broken lines in Fig. 3. Upon complete disengagement of the hook 22 from the passage 6", the bolt 20 as well as the entire upper cover D may be tilted in the opposite direction, as indicated by the arrow X in Fig. 3, away from the pipe B, to uncover completely the upper surface of the pipe B, for removal.

The short peripheral extension of the concave bearing surface 14, namely for only substantially one-fourth of the pipe periphery, and the consequent small height of said bearing surface 14 between the outermost point of the surface 14 and the innermost point 32 thereof, makes possible the tilting of the bolt 20 and the transverse rocking movement of the cover D, after the nut 30 has been loosened for only a few turns without necessity to remove the nut 30 off the bolt 20. The transverse rocking movement of the cover D is facilitated by the elongation of the slot 18, and the tilting, as well as the transverse rocking is in the same plane as the insertion and the removal, respectively, of the hook section 22 relative to the passage 6".

Thereafter, the lower pipe C may be released in a similar manner.

Clamping of the pipes B and C may be accomplished in a similar manner, though in reverse order.

The advantages of the instant clamps are that the covers D are not entirely removed off the bolts 20, yet are completely tilted out of the way about the axes of the cross-bars 28, for insertion or removal of the pipes.

It will be apparent to those skilled in the art that the novel principles of the invention disclosed herein in connection with specific exemplifications thereof will suggest various other modifications and applications of the same.

Having thus described the invention, what I claim as new and desire to be secured by Letters Patent, is as follows:

In an apparatus for releasably clamping two crosswise arranged cylindrical pieces, in combination, a center element having crosswise arranged oppositely directed concave grooves, each substantially matching a portion of the surface of a piece to receive the same and including two opposite integral projections adjacent each groove, one of said projections having a sidewardly directed open passage perpendicularly to the axis of a piece and a latching surface recessed in said passage, the second projection having a slot, a cover movably connected to said center element opposite each groove, and each cover having a concave surface opposite a groove of said center element for engaging one of said pieces therebetween, each cover including at one end a hook having a latching surface projecting through said passage and releasably engaging said first named latching surface, and each cover having in the other end an aperture, each cover being movable in a direction having a sideward component parallel to said passage for engagement and, respectively, disengagement of said hook, said aperture being oblong in the direction of said component, and a clamping element for each cover, each clamping element being pivotally connected to a second projection of said center element and including a stem tiltable in said slot in a plane parallel to the direction of said passage and extending through said aperture of said other end of its cover and including means to engage the same for clamping, said concave surface formed in each cover extending throughout substantially one-fourth of the periphery of the cylindrical piece adjacent thereto, whereby tilting of a stem following unclamping will operate to move the cover connected to said stem perpendicularly to the axis of the piece adjacent said cover towards and from latching position, respectively.

ALBERTO CALBIANI.

References Cited in the file of this patent

UNITED STATES PATENTS

| Number | Name | Date |
| --- | --- | --- |
| 1,918,843 | Holmes | July 18, 1933 |
| 2,021,082 | North | Nov. 12, 1935 |
| 2,060,171 | Burton | Nov. 10, 1936 |
| 2,133,197 | Innocenti | Oct. 11, 1938 |

FOREIGN PATENTS

| Number | Country | Date |
| --- | --- | --- |
| 163,467 | Switzerland | Oct. 16, 1933 |
| 447,865 | Great Britain | May 27, 1936 |
| 553,288 | Great Britain | May 14, 1943 |
| 584,025 | Great Britain | Jan. 6, 1947 |